United States Patent Office 3,274,059
Patented Sept. 20, 1966

3,274,059
STABLE-ENHANCED PLASMIN SOLUTIONS
Maurel N. Richard, Gwynedd Valley, Pa., assignor to Merck & Co., Inc., Rahway, N.J., a corporation of New Jersey
No Drawing. Filed Nov. 13, 1961, Ser. No. 152,030
4 Claims. (Cl. 167—73)

This invention relates to a method of producing an active stable system of plasminogen and streptokinase and to the system so produced. More particularly it relates to the use of certain novel additives for use in such a system, whereby the stability and activity thereof is improved.

Plasminogen, which is also known as profibrinolysin and plasma trypsinogen, is the precursor or the inactive form of plasmin and may be converted to plasmin by combining it in known manner with an activator, such as, for example, streptokinase or staphylokinase. The resulting plasmin is an enzyme, which is also known as fibrinolysin and serum tryptase, and which is used medicinally in the treatment of thromboembolic disorders. As such, it serves to dissolve or dissociate blood clots when injected into the blood stream.

Plasminogen may be obtained from mammalian blood by certain known techniques such as those described by Loomis et al. in Arch. Biochem., 12, 1 (1947); Christensen, in J. Clin. Invest., 28, 163 (1949); Kline in J. Biol. Chem., 204, 949 (1953); and J. L. Oncley et al. in JACS 71:541 (1949), which references are incorporated herein by reference and made a part hereof. Streptokinase is an extracellular bacterial protein, and is produced by actively growing hemolytic streptococci belonging to Lancefield's groups A, human C, and G.

While plasma appears to have a built-in inhibition factor which governs the natural activation of plasminogen, isolated plasminogen, activated by staphylokinase has no such intrinsic inhibitor factor and therefore rapidly loses its generated activity.

It is therefore an object of this invention to provide means for stabilizing a plasminogen-streptokinase system by preserving the lytic activity thereof.

It is another object of this invention to so stabilize the plasminogen-streptokinase system with an additive which is compatible for intravenous injections.

It is another object of this invention to so stabilize the plasminogen-streptokinase system that incidental improvement of clot penetrating ability will result.

Other objects and advantages of the process and composition of this invention will readily become apparent from a reading of the following description and claims.

It has now been discovered that by incorporating an amino acid, which is tolerated upon intravenous injections, into plasminogen, prior to the streptokinase activation thereof, the lytic activity of the streptokinase (hereinafter referred to as SK) activated plasminogen is stabilized. The effect of this stabilization serves to prolong the time subsequent to activation of the plasmin during which the system has substantial lytic activity. While it is not definitely known, it is believed that the amino acid serves to inhibit the activator streptokinase and thereby extend the effect thereof over longer periods of time than normally ensue from streptokinase activation. Lysine, in particular, has been found to function in accordance with this invention, although it is expected that other similar amino acids such as δ-hydroxy lysine, ornithine, arginine and citrulline would give similar effects, but to varying degrees. In accordance with a preferred embodiment of this invention, a non-ionic surfactant, which may be tolerated upon intravenous injection, is incorporated into the plasminogen together with the amino acid. Such surfactant not only provides a more favorable environment for the lytic activity, but appears to potentiate the effect caused by the amino acid. Two suitable non-ionic surfactants, which thus function are Emulphor EL-620, a 100% active, non-ionic, polyoxyethylated vegetable oil having a specific gravity in the range of from 1.04 to 1.05, a proprietary compound manufactured by Antara Chemicals, Div. General Dyestuff Corp., 43 Hudson Street, New York 14, New York; and Pluronics F68, a high molecular weight, non-ionic, condensation product of ethylene oxide with the condensation product formed by condensation of propylene oxide with propylene glycol, a proprietary compound manufactured by Wyandotte Chemicals Corporation, Wyandotte, Michigan.

When lysine is utilized as the stabilization additive in accordance with this invention, it should be incorporated in amounts of at least about one milligram per ml. of plasminogen solution, a preferred range of concentrations being from about one mg./ml. to about two mg./ml. Larger amounts of lysine may be used if desired. Plasminogen concentrations may vary as desired, however, the use of Cohn alcohol Fraction III-3 (prepared by the method described in JACS 71:541–1949) in concentrations from about 5 to about 500 micrograms per ml. of solution has been found to give acceptable results, although it is not a limiting range.

Suitable activation is achieved by use of streptokinase in concentrations of from one to ten units thereof per microgram of Cohn alcohol Fraction III-3 present. The stabilized plasminogen-streptokinase solution of this invention may be stored by warming up to not higher than about 37° C. for a few minutes and dried by conventional biological drying procedures, such as lyophilization and the like. Similar results are obtained when either δ-hydroxy lysine, ornithine, arginine or citrulline is utilized in place of lysine as the stabilization additive therein.

In order to evaluate the activated and stabilized plasminogen-streptokinase systems of this invention, both fibrinolytic and caseinolytic assays were used. The fibrinolytic assay procedure used was that of Baumgarten, Ciminera, and Cole: Vox Sanguinis, 5: 416 (1960), which reference is incorporated herein by reference and made a part hereof. The caseinolytic assay used was that of the Remmert and Cohen, J. Biol. Chem., 181: 431 (1949), which reference is incorporated herein by reference and made a part hereof.

EXPERIMENTAL PROCEDURE—FIBRINOLYTIC ASSAY

The following materials were dissolved when needed:
A. Cohn Fraction III-3 in borate buffer.
B. Emulphor 620 in water or borate buffer.
C. Lysine hydrochloride and Emulphor 620 in water, pH and volume adjusted for particular experiment.
D. Streptokinase in water.
E. Pluronics F68 in borate buffer.
F. Bovine fibrinogen in borate buffer at 10 mg./ml. (Armour Pharmaceutical Company, Kankakee, Michigan).
G. Bovine thrombin in 50% glycerol solution at a concentration of 1000 thrombin units per ml. Diluted to 20 units per ml. with borate buffer before use (Parke-Davis and Company, Detroit, Michigan).

H. Borate buffer—

| | Gm. |
|---|---|
| $Na_2H_4BO_7 \cdot H_2O$ | 4 |
| $H_3BO_3$ | 11.25 |
| NaCl | 2.25 |

Q.s. to 1 liter with distilled water.

Every effort was made to follow a strict time schedule. In Example Nos. 1 and 2 of Table I, at time zero, a sample containing 0.5 ml. of A. above containing 50 micrograms of Cohn alcohol Fraction III–3 (hereinafter represented as III–3) was made to 9 ml. of volume with the borate buffer. After one minute one ml. containing 500 units of streptokinase was added, shaken and placed in a 37° C. water bath. Fourteen minutes later the activated solution was placed at room temperature, and a first aliquot clotted with 1 mg. of bovine fibrinogen and 2 units of bovine thrombin and timed for lysis. All test clots were made 1 ml. with borate buffer being added to secure this volume. Temperature during assay was 37° C. and during storage approximately 22° C. Additional aliquots were taken at two hours after activation and assayed in the same manner as aforesaid. Another aliquot was taken at twenty-four hours after activation, similarly clotted and checked for lysis time.

In Examples 3 and 4 (Table I), the sample contained 50 micrograms of III–3 to 100 micrograms of Emulphor 620, and after being brought to 9 ml. volume was likewise activated with 500 units of streptokinase and its assay begun after exactly the same time interval.

In Examples 5 and 6 (Table I), 50 micrograms of III–3 in a solution containing 100 micrograms of lysine and 100 micrograms of Emulphor 620 was brought to 9 ml. volume with borate buffer, and then activated likewise at a 50 units per ml. level. On the same schedule aliquots were removed, clotted and checked for lysis.

In Examples 7, 8, 15 and 16 (Table II), a solution containing 5 micrograms of III–3 per ml., and activated with 50 units of streptokinase per ml. was assayed at concentrations of .1 ml. and .5 ml., as above described, in accordance with the time schedule shown. On the same time schedule, samples of solution containing 5 micrograms of III–3 per ml. and activated with 50 units of streptokinase per ml. had varying quantities of Emulphor 620 added, which samples were then assayed in accordance with the time schedule of Examples 7, 8, 15 and 16. The results of these assays are tabulated as Examples 9–14 and 17–22 of Table II.

In Examples 23, 24, 31 and 32 of Table III, a solution containing 5 micrograms of III–3 per ml., and activated with 50 units of streptokinase per ml. was assayed at concentrations of .1 ml. and .5 ml., as above described, in accordance with the time schedule shown in Table III.

On the same time schedule, samples of solution containing 5 micrograms of III–3 per ml. and activated with 50 units of streptokinase per ml. had varying quantities of lysine added, which samples were then assayed in accordance with the time schedule of Examples 23, 24, 31 and 32. The results of these assays are tabulated as Examples 25–30 and 33–38 of Table III.

TABLE I

| Example No. | Volume of Enzyme Soln. (ml.) | Hours After Activation | Lysis Time, Min. |
|---|---|---|---|
| 1 | .1 | 0 | 13.5 |
|   |    | 2 | 17.0 |
|   |    | 24 | 105.0 |
| 2 | .5 | 0 | 6.0 |
|   |    | 2 | 7.25 |
|   |    | 24 | 26.0 |
| 3 | .1 | 0 | 9.0 |
|   |    | 2 | 12.5 |
|   |    | 24 | 53.0 |
| 4 | .5 | 0 | 5.0 |
|   |    | 2 | 5.75 |
|   |    | 24 | 19.0 |
| 5 | .1 | 0 | 9.5 |
|   |    | 2 | 12.0 |
|   |    | 24 | 50.0 |
| 6 | .5 | 0 | 5.0 |
|   |    | 2 | 5.5 |
|   |    | 24 | 16.0 |

TABLE II

| Example No. | Volume of Enzyme Soln. (ml.) | Conc. of EL-620 (micrograms/ml.) | Hours After Activation | Lysis Time, Min. |
|---|---|---|---|---|
| 7 | .1 | None | 0 | 14.5 |
|   |    | None | 3 | 13.0 |
|   |    | None | 5 | 24.0 |
|   |    | None | 20 | 33.0 |
| 8 | .5 | None | 0 | 5.0 |
|   |    | None | 3 | 6.0 |
|   |    | None | 5 | 7.0 |
|   |    | None | 20 | 15.0 |
| 9 | .1 | 400 | 0 | 7.75 |
|   |    | 400 | 3 | 9.75 |
|   |    | 400 | 5 | 12.0 |
|   |    | 400 | 20 | 27.0 |
| 10 | .5 | 400 | 0 | 4.25 |
|   |    | 400 | 3 | 5.0 |
|   |    | 400 | 5 | 5.75 |
|   |    | 400 | 20 | 11.5 |
| 11 | .1 | 2,000 | 0 | 7.5 |
|   |    | 2,000 | 3 | 11.75 |
|   |    | 2,000 | 5 | 13.0 |
|   |    | 2,000 | 20 | 28.0 |
| 12 | .5 | 2,000 | 0 | 4.25 |
|   |    | 2,000 | 3 | 4.75 |
|   |    | 2,000 | 5 | 5.45 |
|   |    | 2,000 | 20 | 11.25 |
| 13 | .1 | 10,000 | 0 | 7.25 |
|   |    | 10,000 | 3 | 9.25 |
|   |    | 10,000 | 5 | 10.75 |
|   |    | 10,000 | 20 | 26.0 |
| 14 | .5 | 10,000 | 0 | 4.0 |
|   |    | 10,000 | 3 | 4.75 |
|   |    | 10,000 | 5 | 5.5 |
|   |    | 10,000 | 20 | 11.75 |
| 15 | .1 | None | 0 | 9.0 |
|   |    | None | 3 | 14.25 |
|   |    | None | 6 | 25.0 |
|   |    | None | 20 | 42.0 |
| 16 | .5 | None | 0 | 4.75 |
|   |    | None | 3 | 7.0 |
|   |    | None | 6 | 8.0 |
|   |    | None | 20 | 14.25 |
| 17 | .1 | 25 | 0 | 9.5 |
|   |    | 25 | 3 | 12.75 |
|   |    | 25 | 6 | 19.0 |
|   |    | 25 | 20 | 37.0 |
| 18 | .5 | 25 | 0 | 4.25 |
|   |    | 25 | 3 | 6.0 |
|   |    | 25 | 6 | 7.0 |
|   |    | 25 | 20 | 14.25 |
| 19 | .1 | 125 | 0 | 8.0 |
|   |    | 125 | 3 | 12.0 |
|   |    | 125 | 6 | 16.0 |
|   |    | 125 | 20 | 37.0 |
| 20 | .5 | 125 | 0 | 4.0 |
|   |    | 125 | 3 | 6.0 |
|   |    | 125 | 6 | 7.0 |
|   |    | 125 | 20 | 13.25 |
| 21 | .1 | 250 | 0 | 7.0 |
|   |    | 250 | 3 | 12.75 |
|   |    | 250 | 6 | 16.25 |
|   |    | 250 | 20 | 28.0 |
| 22 | .5 | 250 | 0 | 4.0 |
|   |    | 250 | 3 | 5.25 |
|   |    | 250 | 6 | 6.25 |
|   |    | 250 | 20 | 11.75 |

TABLE III

| Example No. | Volume of Enzyme Soln. (ml.) | Conc. of Lysine (micrograms/ml.) | Hours After Activation | Lysis Time, Min. |
|---|---|---|---|---|
| 23 | .1 | None | 0 | 13.0 |
|    |    | None | 3 | 17.0 |
|    |    | None | 19 | 47.0 |
|    |    | None | 24 | 58.0 |
| 24 | .5 | None | 0 | 5.0 |
|    |    | None | 3 | 6.5 |
|    |    | None | 19 | 18.0 |
|    |    | None | 24 | 21.0 |
| 25 | .1 | 25 | 0 | 13.0 |
|    |    | 25 | 3 | 16.5 |
|    |    | 25 | 19 | 45.0 |
|    |    | 25 | 24 | 53.0 |
| 26 | .5 | 25 | 0 | 5.0 |
|    |    | 25 | 3 | 7.0 |
|    |    | 25 | 19 | 17.0 |
|    |    | 25 | 24 | 19.0 |
| 27 | .1 | 125 | 0 | 10.0 |
|    |    | 125 | 3 | 22.0 |
|    |    | 125 | 19 | 38.0 |
|    |    | 125 | 24 | 50.0 |
| 28 | .5 | 125 | 0 | 5.0 |
|    |    | 125 | 3 | 7.0 |
|    |    | 125 | 19 | 15.0 |
|    |    | 125 | 24 | 17.5 |
| 29 | .1 | 625 | 0 | 8.25 |
|    |    | 625 | 3 | 11.0 |
|    |    | 625 | 19 | 20.0 |
|    |    | 625 | 24 | 23.0 |

TABLE III—Continued

| Example No. | Volume of Enzyme Soln. (ml.) | Conc. of Lysine (micrograms/ml.) | Hours After Activation | Lysis Time, Min. |
|---|---|---|---|---|
| 30 | .5 | 625 | 0 | 5.0 |
|  |  | 625 | 3 | 6.25 |
|  |  | 625 | 19 | 10.0 |
|  |  | 625 | 24 | 11.0 |
| 31 | .1 | None | 0 | 10.25 |
|  |  | None | 3 | 21.0 |
|  |  | None | 20 | 44.0 |
|  |  | None | 24 | 54.0 |
| 32 | .5 | None | 0 | 5.5 |
|  |  | None | 3 | 6.75 |
|  |  | None | 20 | 15.75 |
|  |  | None | 24 | 18.5 |
| 33 | .1 | 400 | 0 | 10.0 |
|  |  | 400 | 3 | 10.0 |
|  |  | 400 | 20 | 18.0 |
|  |  | 400 | 24 | 21.0 |
| 34 | .5 | 400 | 0 | 5.0 |
|  |  | 400 | 3 | 5.75 |
|  |  | 400 | 20 | 9.0 |
|  |  | 400 | 24 | 10.0 |
| 35 | .1 | 2,000 | 0 | 7.5 |
|  |  | 2,000 | 3 | 9.0 |
|  |  | 2,000 | 20 | 14.0 |
|  |  | 2,000 | 24 | 15.0 |
| 36 | .5 | 2,000 | 0 | 6.25 |
|  |  | 2,000 | 3 | 7.75 |
|  |  | 2,000 | 20 | 11.0 |
|  |  | 2,000 | 24 | 11.75 |
| 37 | .1 | 10,000 | 0 | 13.0 |
|  |  | 10,000 | 3 | 13.0 |
|  |  | 10,000 | 20 | 29.0 |
|  |  | 10,000 | 24 | 33.0 |
| 38 | .5 | 10,000 | 0 | 34.0 |
|  |  | 10,000 | 3 | 36.0 |
|  |  | 10,000 | 20 | 80.0 |
|  |  | 10,000 | 24 | 82.0 |

In Examples 39, 40, 43, 44, 47 and 48 (Table IV), a solution containing 5 micrograms of III–3 per ml., and activated with 50 units of streptokinase per ml. was assayed at concentrations of .1 ml. and 0.5 ml., as above-described, in accordance with the time schedule shown in Table IV. On the same time schedule, samples of solution containing 5 micrograms of III–3 per ml. and activated with 50 units of streptokinase per ml. had varying quantities of lysine and Emulphor 620 added, which samples were then assayed in accordance with the corresponding time schedule of Examples 39, 40, 43, 44, 47 and 48. The results of these assays are tabulated as Examples 41, 42, 45, 46, 49, 50, 51 and 52 of Table IV.

TABLE IV

| Example No. | Volume of Enzyme Soln. (ml.) | Conc. of Additives Lysine/Emulphor 620 (micrograms/ml.) | Hours After Activation | Lysis Time, Min. |
|---|---|---|---|---|
| 39 | .1 | None | 0 | 9.5 |
|  |  | None | 1 | 11.0 |
|  |  | None | 3 | 11.75 |
|  |  | None | 5 | 18.0 |
| 40 | 0.5 | None | 0 | 5.0 |
|  |  | None | 1 | 5.75 |
|  |  | None | 3 | 7.00 |
|  |  | None | 5 | 8.30 |
| 41 | .1 | 10/10 | 0 | 8.0 |
|  |  | 10/10 | 1 | 9.5 |
|  |  | 10/10 | 3 | 11.0 |
|  |  | 10/10 | 5 | 13.0 |
| 42 | 0.5 | 10/10 | 0 | 4.5 |
|  |  | 10/10 | 1 | 5.0 |
|  |  | 10/10 | 3 | 5.25 |
|  |  | 10/10 | 5 | 6.75 |
| 43 | .1 | None | 0 | 10.75 |
|  |  | None | 5 | 22.0 |
|  |  | None | 23 | 48.0 |
| 44 | 0.5 | None | 0 | 5.5 |
|  |  | None | 5 | 9.5 |
|  |  | None | 23 | 24.0 |
| 45 | .1 | 260/260 | 0 | 7.75 |
|  |  | 260/260 | 5 | 12.30 |
|  |  | 260/260 | 23 | 24.0 |
| 46 | 0.5 | 260/260 | 0 | 4.50 |
|  |  | 260/260 | 5 | 6.25 |
|  |  | 260/260 | 23 | 12.0 |
| 47 | .1 | None | 0 | 9.0 |
|  |  | None | 2 | — |
|  |  | None | 4 | 16 |
|  |  | None | 6 | 16 |
|  |  | None | 22 | 44 |
|  |  | None | 45 | 60 |
|  |  | None | 71 | 195 |
| 48 | 0.5 | None | 0 | 4.75 |
|  |  | None | 2 | 5.25 |
|  |  | None | 4 | 7.0 |
|  |  | None | 6 | 7.25 |
|  |  | None | 22 | 15.0 |
|  |  | None | 45 | 25.0 |
|  |  | None | 71 | 34.0 |
| 49 | .1 | 400/400 | 0 | 6.5 |
|  |  | 400/400 | 2 | 7.0 |
|  |  | 400/400 | 4 | 7.75 |
|  |  | 400/400 | 6 | 8.5 |
|  |  | 400/400 | 22 | 14.5 |
|  |  | 400/400 | 45 | 19.5 |
|  |  | 400/400 | 71 | 24.0 |
| 50 | 0.5 | 400/400 | 0 | 4.25 |
|  |  | 400/400 | 2 | 4.25 |
|  |  | 400/400 | 4 | 4.5 |
|  |  | 400/400 | 6 | 4.75 |
|  |  | 400/400 | 22 | 6.75 |
|  |  | 400/400 | 45 | 9.0 |
|  |  | 400/400 | 71 | 11.5 |
| 51 | .1 | 2,000/2,000 | 0 | 6.0 |
|  |  | 2,000/2,000 | 2 | 6.25 |
|  |  | 2,000/2,000 | 4 | 7.0 |
|  |  | 2,000/2,000 | 6 | 6.75 |
|  |  | 2,000/2,000 | 22 | 9.0 |
|  |  | 2,000/2,000 | 45 | 11.0 |
|  |  | 2,000/2,000 | 71 | 13.0 |
| 52 | 0.5 | 2,000/2,000 | 0 | 6.5 |
|  |  | 2,000/2,000 | 2 | 5.75 |
|  |  | 2,000/2,000 | 4 | 6.0 |
|  |  | 2,000/2,000 | 6 | 6.0 |
|  |  | 2,000/2,000 | 22 | 7.25 |
|  |  | 2,000/2,000 | 45 | 8.75 |
|  |  | 2,000/2,000 | 71 | 9.5 |

EXPERIMENTAL PROCEDURE—CASEINOLYTIC ASSAY

The following solutions were prepared:

A. Heated Cohn Fraction III–3 (860 mg. in 10.2 ml. water).

B. Lysine hydrochloride (250 mg.)+Emulphor 620 (40 mg.), solution adjusted to pH 7.2 and 10 ml. volume.

C. Streptokinase (60 mg. diluted to 100 units/ml.).

D. Phosphate saline buffer—

|  | G. |
|---|---|
| $KH_2PO_4$ | 13.6 |
| NaCl | 9.0 |

Dissolve in water, adjust pH to 7.4 with sodium hydroxide and adjust volume to 1 liter with distilled water.

These solutions were compounded as follows for use in the corresponding examples.

| Example No. | Compositions |
|---|---|
| 53 | 2.5 ml. A+ _____ +0.5 ml. C+2.0 ml. D |
| 54 | 2.5 ml. A+0.5 ml. B+0.5 ml. C+1.5 ml. D |
| 55 | _____ +0.5 ml. B+0.5 ml. C+4.0 ml. D |
| 56 | 2.5 ml. A+0.5 ml. B+ _____ +2.0 ml. D |
| 57 | 2.5 ml. A+ _____ + _____ +2.5 ml. D |
| 58 | _____ +0.5 ml. B+ _____ +4.5 ml. D |
| 59 | _____ + _____ +0.5 ml. C+4.5 ml. D |
| 60 | _____ + _____ + _____ +5.0 ml. D |

The compositions of Examples 53–60 were activated on schedule, warmed for ten minutes at 37° C., and then a 0.5 ml. aliquot of each was placed in the standard casein assay (Remmert and Cohen, supra). At intervals of five hours and twenty-four hours later, other aliquots were removed and assayed. Between assays, the solutions were stored at room temperature, approximately 22° C. From Examples 55, 58 and 59, no increase in optical density appeared, while the other solutions gave the following values of unit activity, expressed as units per milligram of nitrogen:

TABLE V.—INCREASED CASEINOLYTIC ACTIVITY FROM ADDITION OF LYSINE AND EMULPHOR 620 TO STREPTOKINASE ACTIVATED COHN ALCOHOL FRACTION III-3.

| Example | Units/mg. N | | |
|---|---|---|---|
| | 0 Time | 5 Hours | 24 Hours |
| 53 | 18.15 | 16.10 | 12.75 |
| 54 | 21.70 | 21.60 | 17.80 |
| 56 | 9.40 | 16.80 | 18.50 |
| 57 | 6.30 | 6.60 | 8.25 |

For purposes of comparison, Example 53 is considered the control value. Example 54, which contains the lysine and Emulphor 620 mixture, shows a high proteolytic value and a higher percentage activity remaining at the end of twenty-four hours. The solution of Examples 56 and 57 contains no streptokinase, and by comparison with Example 54 indicates that the inclusion of lysine and Emulphor 620 produced as much activity after five hours as did streptokinase.

From the foregoing examples, it is apparent that the inclusion of lysine in streptokinase activated plasminogen enhances and prolongs the lytic activity of such material. This effect is beneficial where lytic solutions intended for intravenous injections must remain at room temperature for some time. It is also apparent that the additional inclusion of Emulphor 620 together with lysine, in the streptokinase activated plasminogen system, secures consistently higher activity values than where lysine alone is utilized. However, the Emulphor 620 does not show the capacity for stabilizing lytic activity that is shown by lysine. Therefore, the effect of the wetting agent, Emulphor 620 is a potentiation of the lysine stabilization. Similar potentiation is afforded by the use of the wetting agent Pluronics F68, although the initial activity levels effected therewith are not as high as when Emulphor 620 is used.

It is believed that the lysine effect upon the streptokinase activated system is due to an inhibitory action with respect to the rate of activation thereof. Additional evidence of this phenomenon is adduced from the following example:

*Example 61*

In accordance with the fibrinolytic assay hereinbefore described, the lysis time of a solution of Cohn Fraction III-3 in borate buffer, activated at a 5 microgram per ml. level with streptokinase, and having incorporated therewith 10,000 micrograms per ml. each of lysine and Emulphor, was determined at various levels of dilution against the standard test clot. The results are tabulated in Table VI.

TABLE VI.—EFFECT OF DILUTION ON LYSINE-EMULPHOR 620–SK–III–3 SOLUTION

| Enzyme concentration in test clot (micrograms/ml.) | Lysis time (minutes) |
|---|---|
| 0.1 | 25.0 |
| 0.25 | 17.0 |
| 0.5 | 17.0 |
| 1.25 | 30.0 |
| 2.5 | 50.0 |

From Example 61 it can be seen that the inhibitory effect of lysine on the lytic activity of streptokinase activated plasminogen ceases as the concentration of lysine is lowered from high values.

Having thus described my invention, I claim:

1. A stabilized solution of plasmin having enhanced proteolytic activity consisting essentially of
   (1) a solution of Cohn alcohol Fraction III-3 having an initial plasminogen concentration within the range of from about 5 micrograms per ml. of solution to about 500 micrograms per ml. of solution,
   (2) an amount of streptokinase within the range of from about one to about ten units thereof per microgram of said solution, and
   (3) an amount of lysine within the range of from about 125 micrograms per ml. to about 2000 micrograms per ml. of said solution.

2. The stabilized plasmin solution of claim 1 containing additionally a non-ionic wetting agent selected from the class consisting of
   (1) polyoxyethylated vegetable oil having a specific gravity of from about 1.04 to about 1.05 and
   (2) the product formed by condensation of ethylene oxide with the condensation product of propylene oxide and propylene glycol.

3. A method of preparing plasmin having enhanced proteolytic activity comprising the steps of
   (1) preparing a solution of Cohn alcohol Fraction III-3, said solution having a plasminogen concentration in the range of from about 5 micrograms per ml. of solution to about 500 micrograms per ml. of solution,
   (2) converting the plasminogen concentration of the solution of step (1) into plasmin by activation with streptokinase in the amount of from about one to ten units thereof per microgram of said solution, and
   (3) incorporating lysine into said solution in an amount within the range of from about 125 micrograms per ml. to about 2000 micrograms per ml. of said solution at a time not later than the activation of said plasminogen.

4. The method in accordance with claim 3 including the step of incorporating a non-ionic wetting agent selected from the class consisting of
   (A) polyoxyethylated vegetable oil having a specific gravity of from about 1.04 to about 1.05 and
   (B) the product formed by condensation of ethylene oxide with the condensation product of propylene oxide and propylene glycol.

References Cited by the Examiner

Alkjaersig et al., e-Aminocaproic Acid: an Inhibitor of Plasminogen Activation, in Journal of Biological Chemistry, 234(4): pp. 832–7, April 1959.

Kline, D. L., Studies on the Purification and Activation of Plasminogen, in Yale Journal of Biol. Med., 26(5): pp. 365–71, April 1954.

Troll, W., The Action of Plasmin on Synthetic Substrates, in Jour. of Biol. Chem., 208: pp. 85–93, May-June 1954.

JULIAN S. LEVITT, *Primary Examiner.*

FRANK CACCIAPAGLIA, JR., *Examiner.*

EUGENE FRANK, MARTIN J. COHEN,
*Assistant Examiners.*